United States Patent [19]

Gold et al.

[11] 4,436,111
[45] Mar. 13, 1984

[54] HYDRAULIC FUSE VALVE

[76] Inventors: Harold Gold, 3645 Tolland Rd., Shaker Heights, Ohio 44122; Tadeusz Budzich, 80 Murwood Dr., Moreland Hills, Ohio 44022

[21] Appl. No.: 285,596

[22] Filed: Jul. 21, 1981

[51] Int. Cl.³ .............................................. F16K 17/30
[52] U.S. Cl. ..................................... 137/498; 137/517; 251/DIG. 3
[58] Field of Search ............... 137/460, 498, 504, 517; 251/DIG. 3

[56] References Cited

U.S. PATENT DOCUMENTS

| | | | |
|---|---|---|---|
| 484,526 | 10/1892 | Valentine . | |
| 547,506 | 10/1895 | Sleigh et al. . | |
| 1,079,985 | 12/1913 | Kaminsky | 251/DIG. 3 |
| 1,258,114 | 3/1918 | Hayward . | |
| 2,307,949 | 1/1943 | Phillips | 137/498 |
| 2,623,725 | 12/1952 | Sands | 137/498 X |
| 2,806,484 | 9/1957 | Schultz | 137/460 |
| 2,925,826 | 2/1960 | Streeter . | |
| 2,929,403 | 3/1960 | Streeter . | |
| 3,011,512 | 12/1961 | Moen | 251/DIG. 3 |
| 3,406,713 | 10/1968 | Borch | 137/498 |
| 3,659,433 | 5/1972 | Shaw | 137/517 X |
| 3,661,175 | 5/1972 | Tillman | 137/517 |
| 3,735,777 | 5/1973 | Katzer et al. . | |

FOREIGN PATENT DOCUMENTS

| | | | |
|---|---|---|---|
| 532182 | 10/1956 | Canada | 137/498 |
| 1646 | 12/1877 | Fed. Rep. of Germany | 251/DIG. 3 |
| 1197177 | 11/1959 | France | 137/460 |
| WO79/00212 | 4/1979 | PCT Int'l Appl. | 251/DIG. 3 |

*Primary Examiner*—Robert G. Nilson
*Attorney, Agent, or Firm*—Yount & Tarolli

[57] ABSTRACT

A hydraulic fuse for shutting off the line flow once the flow through the line reaches a certain maximum predetermined value. The spring biased movable closure element of the fuse is actuated by two force generating members positioned in series, the upstream of those members generating high actuating force, rapidly increasing with the displacement of the movable closure and configured to be relatively independent of fluid viscosity. The rate of increase in the actuating force, in respect to the displacement of the closure, can be selected at any desired level permitting the use of high rate of the biasing springs and resulting in fast enough response to trigger the fuse action by flow transient, due to the decompression of hydraulic fluid caused by a ruptured line.

6 Claims, 8 Drawing Figures

HYDRAULIC FUSE VALVE

BACKGROUND OF THE INVENTION

This invention relates to hydraulic fuses or more generally to fluid fuses, for use with gases as well as liquids. Hydraulic fuses of the prior art as represented by Jackson 3,741,241 employ a valve that is biased open by a spring and is driven closed by an actuator responsive to the pressure drop across the valve. Up to a flow rate that produces a closing force that is greater than the spring force the valve acts like a fixed orifice. For a fixed orifice the pressure drop can be expressed by the following well known formula.

$$P = K(Q/CA)^2$$

where
P = pressure drop
Q = flow rate
C = flow coefficient
A = orifice area
K = dimensional constant The flow coefficient C is highly dependent on the following factors: the shape of the orifice, the passage contours on both sides of the orifice and the fluid viscosity. When the fluid is an oil the magnitude of the variation of C due to these factors can exceed a factor of ten, which would be shown by equation (1) result in greater than a hundred fold variation in pressure drop at fixed flow rate and orifice area. Furthermore, the requirement for shut-off capability interferes with geometric simplicity in the orifice design and leads to complex flow paths and orifice shapes. The determination of area and flow coefficient of this type of orifice requires flow calibration and is therefore expensive to manufacture,. These effects cause a variability in fuse shut-off flow rate which can result in shut-offs substantially above or below the intended value. Particularly discouraging to the use of fuses in hydraulic systems is shut-off below the intended flow rate during cold start-up because of the high viscosity of cold oil.

In practical use the flow rate through a fuse is frequently limited by an upstream throttle or flow regulator to a value that is below the shut-off setting of the fuse. Under this limiting rupture of the hose does not produce a sufficient flow increase to result in fuse shut-off. In order for a fuse shut-off under this circumstance it must have adequate response to the short decompression flow pulse that follows rupture. High responsiveness of a fuse to a short pulse of high flow rate is dependent on three characteristics of its moving element: low friction, high force response to flow rate and high ratio of bias spring rate to mass of the moving parts. The large diameter sliding pistons characteristics of the prior art are not conductive a very low friction or very low mass. In particular, the valve configurations of the prior art require the bias springs of the lowest possible spring rates in order to obtain large valve area changes with minimum flow rate change. The use of an accumulator between the throttle and the fuse to increase the decompression pulse duration relieves the fuse response requirement but can introduce an unacceptable lag into the operating system.

SUMMARY OF THE INVENTION

In the present invention the flow passes through a sensing orifice that is in series with the shut-off valve. By separating the two functions, the design of each of the elements can be optimized. A highly accurate and viscosity independent fuse is thereby obtained. The sensing utilizes a sharp edged disc that is movable axially in a conical bore thereby forming a variable annular orifice much in the same manner as utilized in precision flow meters, known as rotameters. In the rotometer the pressure drop across the orifice drives the disc in the divergent direction, whereas in the fuse the disc is driven in convergent direction. As in rotometers the cone angle employed in the fuse is small, in the order of 20 degrees or less. In view of these similarities it is clear that the accuracy, reproducibility and viscosity independence demonstrated in rotometer manufacture is obtainable in the fuse. The small cone angle prohibits seating the dics in the conical bore. Seating would destroy the sharp edge of the disc and cause wedging which would prevent the disc from resetting after pressure equalization. In this invention the conical bore is truncated at its convergent end and is joined to a coaxial cylindrical bore of equal diameter. This diameter is slightly larger than the diameter of the disc so that the disc can move through the conical bore and into the cylindrical bore without wall contact. The disc is integral with a coaxial cylindrical shaft of much smaller diameter on its upstream side and is integral with or in direct contact with the shut-off valve on its down stream side. The shaft rides in a bearing which provides a low friction coaxial guide. The shut-off valve is driven toward closed position as the disc moves into the converging bore.

The movement of the disc into the convergent bore under constant through flow causes an increase in pressure drop across the sensing orifice. This effect generates what may be called a negative spring. The fuse parameters can be selected so that at the desired flow rate force acting through this negative spring is greater than the force acting through the bias spring and the rate of the negative spring is greater than the rate of the bias spring. The fuse snaps closed under these conditions, or triggers. The negative spring that is created by the sensing orifice permits the use of bias springs having much higher spring rates than the rates that can be used in fuses of the prior art. The high spring rate and the trigger action are conducive to the achievement of shut-off under decompression flow pulses. After shut-off the fuse is held closed by a force equal to the product of system pressure and the unbalanced area of the shut-off valve. The valve is stressed by this force but the sensing orifice disc is unstressed.

Accordingly, it is an object of this invention to provide a fuse that can operate over a wide viscosity range without significant change in shut-off flow rate.

It is another object to provide a fuse that gives complete shut-off at a triggering flow rate.

It is another object to provide a fuse that operates at very low pressure loss under normal flow rate and with no significant pressure loss up to the shut-off flow rate.

It is another object to provide a fuse that is responsive to the decompression flow rate pulse that follows hose bursting, without the use of an accumulator.

It is another object to provide a fluid fuse that is readily assembled to a high accuracy of shut-off flow rate.

It is a further object to provide a fluid fuse assembly that can be inserted into an existing hose fitting to boss assembly without modification of either the hose fitting or the boss.

DESCRIPTION OF THE PREFERRED EMBODIMENTS

Figure 1:
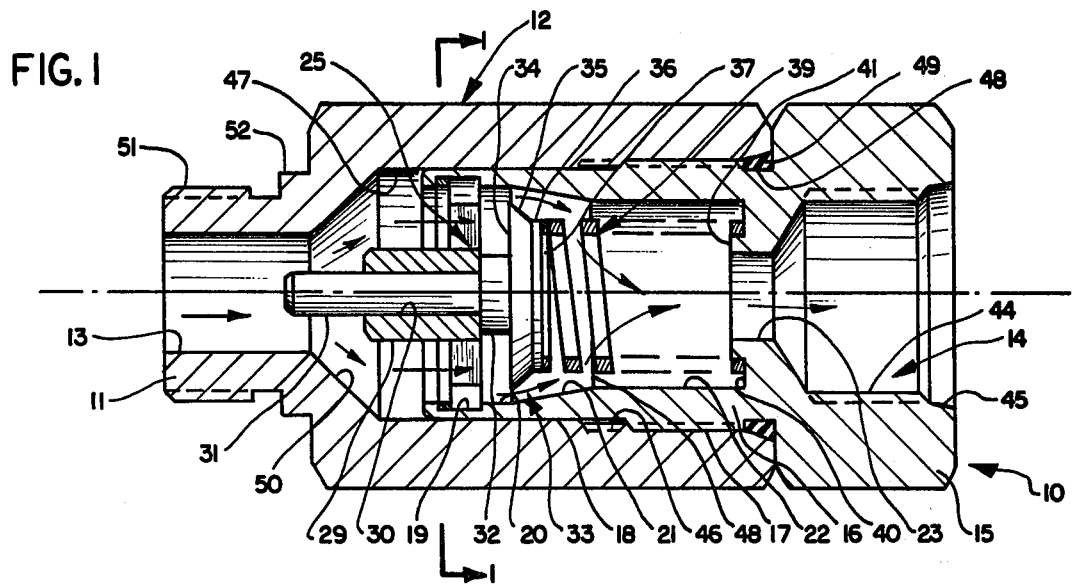
FIG. 1 is a longitudinal section through a fluid fuse embodying the features of this invention.
Figure 2:
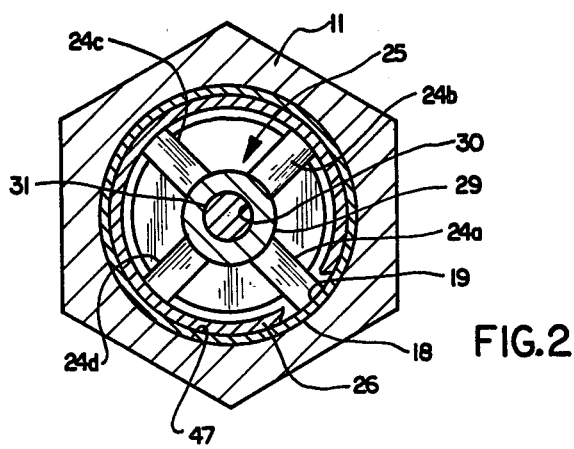
FIG. 2 is a sectional view taken in the plane of 1—1 of FIG. 1.
Figure 4:
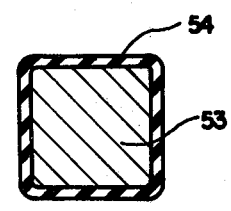
FIG. 4 is an enlarged sectional view of the spring wire shown in FIG. 1.
Figure 3:
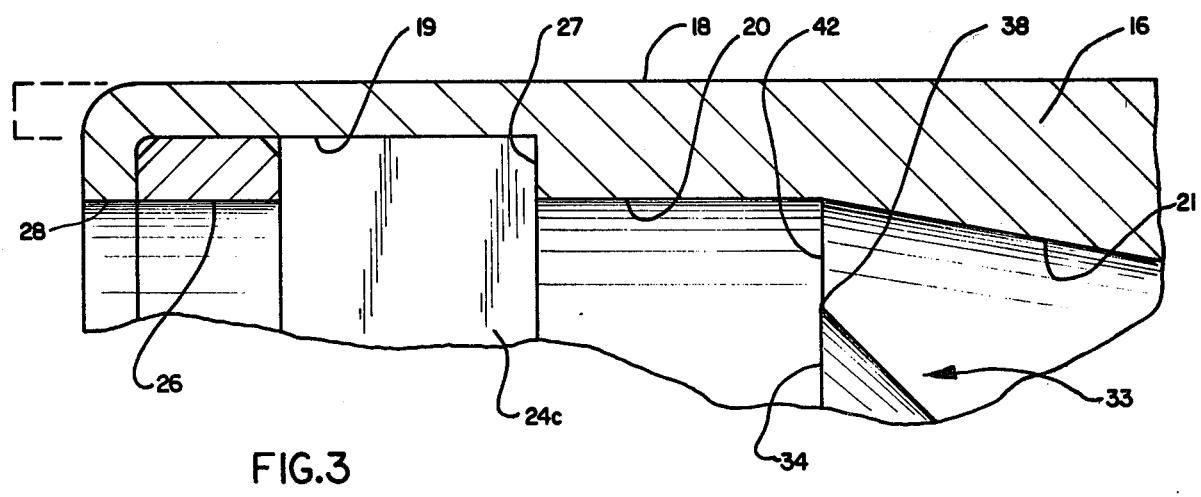
FIG. 3 is an enlarged fragmentary view of the joining mechanism indicated in the fuse shown in FIG. 1 and also in FIGS. 5 and 6.

In the embodiment illustrated in FIG. 1 fuse subassembly 10 is coupled to an adapter 11 to provide a fuse assembly 12 having an inlet bore 13 and an outlet bore 14. Subassembly 10 has a bolt like head 15 and a shank 16. Shank 16 has a threaded section 17 and a cylindrical extension 18. Shank 16 has a recessed bore 19, first cylindrical bore 20, convergent bore 21, second cylindrical bore 22 and discharge bore 23 in sequence. As illustrated in FIG. 2, recessed bore 19 holds the finger extensions 24a to 24d of disc guide 25 and ring 26. As further illustrated in FIG. 3 ring 26 and finger extensions 24a–24d are held between shoulder 27 and lip 28. Lip 28 is formed from the extension of shank 16, shown in dashed lines, which is spun or otherwise shaped to the lip form shown. At the completion of the forming operations fingers 24a–24d are pressed against shoulder 27 and are thereby accurately positioned perpendicular to the coaxial bores 19–22. Center body 29 of guide 25 is integral with fingers 24a–24d and contains guide bore 30. Bore 30 is perpendicular to fingers 24a–24d and is accurately positioned coaxial to bores 20–22 by a close diametral fit of the tips of fingers 24a–24d in bore 19. Ring 26 provides the structural support to the wall of extension 16 in the spaces between fingers 24a–24d that is required during the spinning operation. The position of the fingers 24a–24d has been rotated out of the section plane in FIGS. 1 and 3 in order to illustrate the clear flow path between the fingers. The rotational position of the fingers 24a–24d is functionally arbitrary. As shown in FIG. 1 shaft 31 fits with small running clearance in bore 30 and is integral with spacing shoulder 32 and disc 33. Disc 33 has a flat upstream side 34 and the down stream side comprises cone 35, spring seat 36 and spring shoulder 37. The intersection of cone 35 and flat side 34 forms a circular sharp edge as shown in FIG. 3. Spring 39 engages seat 36 and shoulder 37 on one end and engages the end wall 40 and shoulder 41 at its other end. In the free flow position shown in FIG. 1 spring 39 presses shaft shoulder 32 against guide 25. The space provided by shoulder 32 equals the length of bore 20 and provides a settling length for the flow coming off fingers 24a–24d upstream of the annular sensing orifice 42, as shown in FIG. 3, that is formed between edge 38 of disc 33 and the wall of converging bore 21. Flow passing through orifice 42 passes simultaneously through the annular passage between the outside of spring 39 and bore 21 and 22 and through the spring orifice 43 formed by the open spaces between the coils of spring 39. In the shut-off action of the fuse the disc 33 moves into bore 21 and compresses spring 39. As the spring is compressed the open space between the coils reduces and thereby the spring provides an essentially linear reduction in orifice area with compression. Thus in this embodiment the spring is utilized to provide both the open bias force and the shut-off valve function. The fuse can be readily proportioned so that in the free flow state the area of spring orifice 43 is substantially larger than the area of sensing orifice 42 so that the shut-off flow rate is controlled principally by the accurately producible and viscosity insensitive sensing orifice 42. By way of example, if the ratio of spring orifice area to sensing orifice area is three, the pressure drop across the sensing orifice is nine times greater. The closing force ratio is further magnified by the ratio of the area of disc 33 to the inside area of spring 39 which is fixed by the geometry to be approximately three and therefore the contribution of the sensing orifice to the closing force is approximately twenty seven times greater than that of the spring orifice. When the flow through the fuse creates a closing force that is slightly greater than the spring force sensing orifice 42 and spring orifice 43 both begin to close. The increased pressure drops that result from the reduced orifice areas generate an increased closing force with inward travel. This effect is opposite to the spring rate effect of spring 39 and is consequently called a negative spring-rate. When the magnitude of the negative spring rate exceeds the spring-rate of spring 39 the fuse completes the closing action with no increase in through-flow. It can be shown mathematically that the magnitude of the negative spring rate is proportional to two terms: one proportional to the area of disc 33 divided by the cube of the area of orifice 42 and the other proportional to the inside area of spring 39 divided by the cube of the area of orifice 43. Thus in the example given the contribution of the sensing orifice to the negative spring rate is approximately eighty times greater than is contributed by the spring orifice. Thus both the initial triggering force and the rate of increase of closing force with closing displacement of disc 33 is controlled by the sensing orifice 42. The high values of negative spring rate obtainable with the sensing orifice of this invention eliminates the need for the low rate bias spring characteristics of the prior art. Increasing the spring-rate of the bias spring increases the natural frequency of the fuse spring-mass system. The higher natural frequency makes the fuse less likely to be triggered by line shock or vibration. The very high negative spring rate makes the fuse of this invention very responsive to decompression flow pulses.

After shut-off the spring 39 is subject to an axial force equal to the system pressure times the area of the inside of the spring. The resulting compressive stress in the spring is not very high even with the highest system pressures currently in use, nor is the spring likely to fail under column instability; however, in the case of round wire, normal coil excentricity could lead to coil breakout. The use of square wire eliminates this possibility, but the contact stress between the coils is much lower. An elastomeric coating is therefore applied to increase the fluid seal capability under low contact stress. FIG.

4 shows an enlarged cross-section of the square wire used in spring 39. Wire 53 is covered with a thin elastomeric coating 54.

Discharge bore 23 opens into outlet bore 14. Bore 14 has internal threads 44 and an O ring cavity 45 which represents a characteristic suitable for mating with a class of hose fittings. When subassembly 10 is screwed into adapter 11 as shown in FIG. 1 male thread 17 of subassembly 10 mates with internal threads 46, cylindrical extension 18 of assembly 10 slides freely into bore 47 and seal ring 48 is enclosed in cavity 49. Bore 47 connects to inlet bore 13 through conical bore 50. The threaded projection 51 and shoulder 52 represents a characteristic suitable for mating with a class of hydraulic output bosses. Wrench flats such as the hexagonal form shown in FIG. 2 provide a means for tightening subassembly 10 into adapter 11 and adapter 11 into a hydraulic output boss. The fuse assembly of this invention can employ a wide variety of fastening and wrenching means and/or adapter means without departing from the scope of this invention.

In view of the foregoing description, it is apparent that the valve assembly 10 is operable to block fluid flows in excess of a predetermined flow. The valve assembly 10 includes a housing having two interconnected sections 11 and 15 with an inner side surface which includes a converging surface area 21. The converging surface area 21 has a relatively large diameter inlet and a relatively small diameter outlet which is disposed downstream of the inlet. Fluid is conducted to the converging surface area through a cylindrical inlet area or bore 20 and is conducted from the converging surface area through a cylindrical outlet or bore 22.

A flow control member 33 is disposed in the housing. The flow control member 33 includes a circular rim 38 having a sharp edge. The sharp edged rim 38 on the flow control member cooperates with the converging surface area 21 to form an annular orifice. The flow control member 33 is movable relative to the housing between a first position (see FIG. 1) in which the sharp edge portion on the rim of the flow control member cooperates with the converging surface to form an annular orifice having relatively large cross sectional area. Upon the occurrence of an excessive pressure differential across the valve assembly, the flow control member 33 moves from the open position shown in FIG. 1 to a closed position. When the flow control member 33 is in the closed position, fluid flow through an orifice 43 formed between coils of a spring 39 is blocked to thereby block fluid flow through the valve assembly.

During movement of the flow control member from the open position to the closed position, the sharp edge portion of the rim 38 is disposed radially inwardly of the converging surface area 21 during at least a major portion of the movement of the flow control member. This results in a decrease in the size of the orifice 42 as the flow control member moves from the open position toward the closed position.

Figure 5:
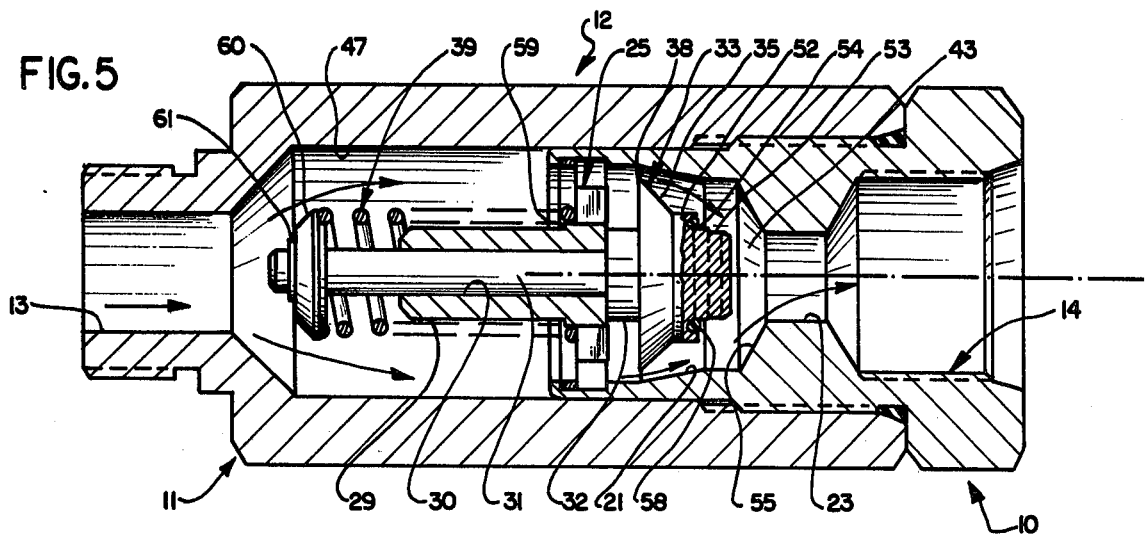
FIG. 5 is a longitudinal section through a fuse embodying the features of this invention and illustrating the use of an alternate shut-off valve means.
Figure 7:
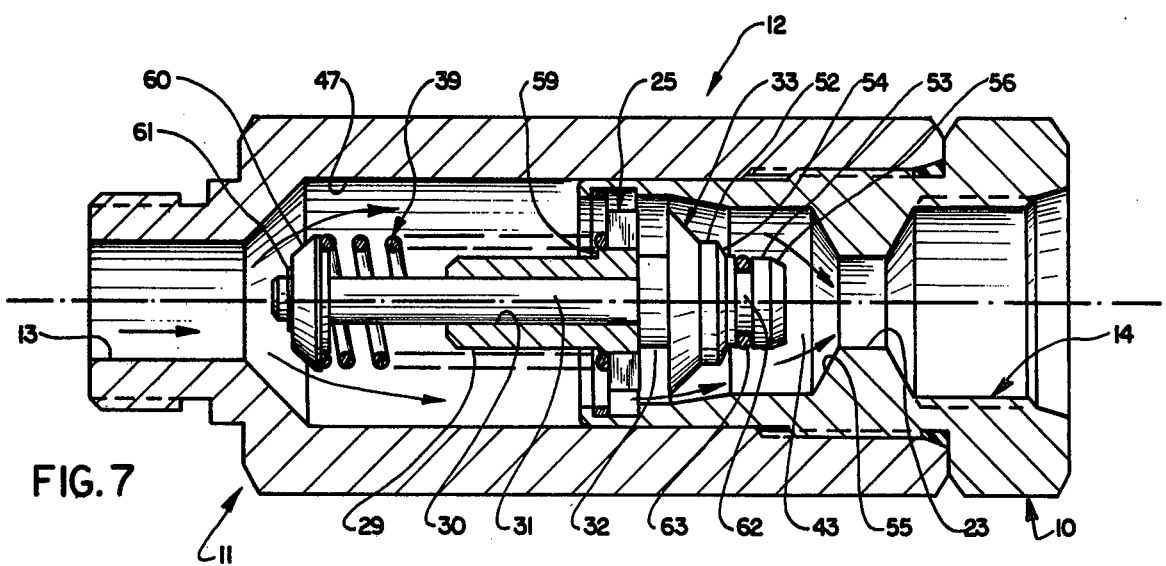
FIG. 7 is a longitudinal section through a fuse embodying the features of this invention and illustrating a second alternate shut-off valve means.
Figure 6:
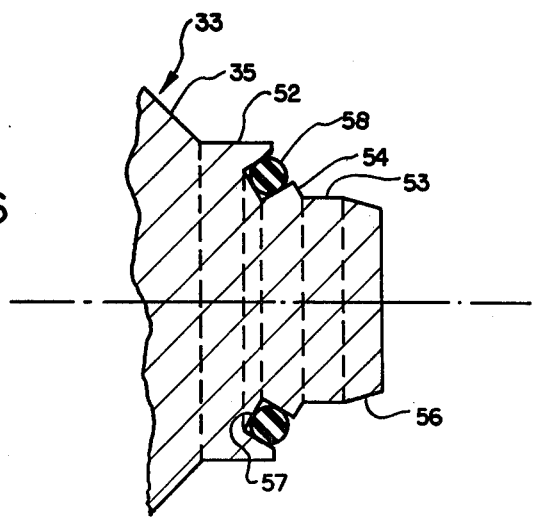
FIG. 6 is an enlarged fragmentary sectional view of the sealing element of the shut-off valve in the embodiment of FIG. 5.

In the embodiments shown in FIGS. 5-7 the shut-off function of the bias spring that is employed in the embodiment of FIG. 1 is performed by a separate mechanical shut-off device. The use of these alternate shut-off devices requires the mechanical adaptation shown wherein the bias spring 39 is moved to the upstream side of disc guide 25. In the embodiments shown in FIGS. 5-7 elements that are functionally common to the elements identified in FIGS. 1-3 are assigned the same numbers.

In the embodiment shown in FIGS. 5 and 6 sensing orifice disc 33 is integral with coaxial cylinder 52. Cylinder 52 reduces to smaller diameter cylinder 53 through conical shoulder 54. The diameter of cylinder 53 is slightly less than the diameter of discharge bore 23 and the cone angle of shoulder 54 is slightly less than the cone angle of wall 55. Conical lead 56 pilots cylinder 53 into bore 23. As also shown in FIG. 6 conical shoulder 54 has a circular groove 57 which is proportioned to hold O ring 58 or a similar elastomeric gasket. During shut-off action cylinder 53 very substantially reduces the velocity over seal ring 58 prior to close approach of shoulder 54 to wall 55 and thereby prevents ring 58 from being drawn out of groove 57. The shoulder 54 cone angle restraint mentioned above insures metal to metal contact on the down stream side of groove 57, thereby preventing ring extrusion after seating. In the free flow state shown in FIG. 5 orifice 43 is the open flow path between the leading edge of cylinder 53 and the opposite edge of bore 23. The area of this type of orifice is essentially linear with the distance between the leading edge of cylinder 53 and the opposing edge of bore 23 and can be mathematically represented by a cylindrical surface having a diameter equal to the diameter of bore 23 and a length equal to the axial distance between the leading edge of cylinder 53 and the opposing edge of bore 23. This orifice 43 is therefore functionally the same as the spring orifice 43 shown in the embodiment of FIG. 1. Spring 39 functions in the embodiment of FIG. 5 to provide the bias force only and is therefore not subject to solid height compression as in the embodiment of FIG. 1. In this embodiment conical shoulder 54 resists the pressure load after shut-off. For these reasons a round wire spring can be used as shown in FIG. 5. Spring 39 engages the upstream face of guide 25 and is spaced away from center body 29 by shoulder 59. At its opposite end spring 39 engages disc 60 which is bored to slip over shaft 31 and is retained by snap ring 61.

In the embodiment of the invention illustrated in FIGS. 5 and 6, the valve assembly 10 has a housing with a central bore or passage in which a flow control member 33 is disposed. The housing includes a converging surface area 21 having a relatively large diameter upstream inlet and a relatively small diameter downstream outlet. A valve seat 55 is disposed downstream from the converging surface area 21. The valve seat 55 has a surface area which also converges from a relatively large diameter upstream end portion to a relatively small diameter downstream end portion.

The flow control member 33 is movable between an open position shown in FIG. 5 and a closed position in which the flow control member engages at least a portion of the valve seat 55 to block fluid flow through the housing 11. The flow control member 33 includes a circular rim having a sharp edge which is disposed radially inwardly of the converging surface area 21 during at least a major portion of the movement of the flow control member from the open position shown in FIG. 5 to a closed position blocking fluid flow through the housing.

A conical side surface 35 on the flow control member 33 extends at an acute angle to the converging surface 21 so that the downstream side 35 of the flow control member 33 diverges from the converging surface 21 to provide a fluid receiving space which expands immediately downstream of the sharp edge 38. This results in the pressure drop across an orifice formed between the sharp edge 38 and the converging surface 21 being substantially independent of fluid viscosity. Since the sharp edge 38 is disposed radially inwardly of a converging surface 21 during at least a major portion of the movement of the flow control member 33 from the open position to the closed position, the size of the orifice between the sharp edge and the converging surface continuously decreases during at least a major portion of the movement of the flow control member between the open and closed positions.

The flow control member 33 has a leading or downstream end portion (FIG. 5) which cooperates with the converging surface 55 of the valve seat to form a second orifice. This second orifice continuously decreases in size during at least a major portion of the movement of the flow control member from the open position to the closed position.

The flow control member also has a stem portion 31 which extends axially upstream away from the sharp edged rim 38. The stem portion 31 is engaged by a guide surface 30 which guides movement of the flow control member 33 between the open and closed positions. A coil spring 39 is disposed in a telescopic relationship with the stem 31. A retainer or shoulder 59 engages the downstream end of the spring 39 and holds it against axial movement relative to the housing 11. A second retainer 60 engages the upstream end of the spring 69 and holds it against axial movement relative to the stem 31. As the flow control member 33 moves toward the closed position, the upstream retainer 60 moves toward the downstream retainer 59 to compress the coil spring 39.

When the valve assembly 10 is operated from the open position shown in FIG. 5 to the closed position, the seal ring 58 (FIG. 6) sealingly engages the valve seat 55. When the seal ring 58 engages the valve-seat 55, it is deformed and cushions the impact of the flow control member 33 with the valve seat. The relatively hard to deform metal of the conical shoulder 54 also engages the valve seat.

FIG. 7 illustrates a third embodiment of this invention. In FIG. 7 orifice disc 33 is integral with cylinder 52 which reduces to smaller cylinder 53 through conical shoulder 54. The diameter of cylinder 53 is slightly less than the diameter of bore 23 and the cone angle of shoulder 54 is substantially the same as the cone angle of wall 55. Cylinder 53 has a circumferential groove 62 proportioned to accomodate elastomeric O ring 63 and conical lead 56 pilots cylinder 53 into bore 23. The intersection of wall 55 and bore 23 is rounded as indicated to avoid the shaving of O ring 63 during insertion of cylinder 53 into bore 23. In the configuration of FIG. 7 the required insertion distance of cylinder 53 into bore 23 is greater than that required in the configuration of FIG. 5. The length of spring 39 is therefore greater and a greater overall length of the fuse assembly results; nevertheless, the reliability of the O ring retention is greater in the larger fuse sizes encountered in practice. Where zero leakage after shut-off is a requirement the shut-off means shown in FIGS. 5 and 7 present a higher degree of reliability than that of FIG. 1. The differences in common elements between the embodiments of FIGS. 5-7 and the embodiments of FIGS. 1-3 are the result of design rather than functional considerations.

Figure 8:
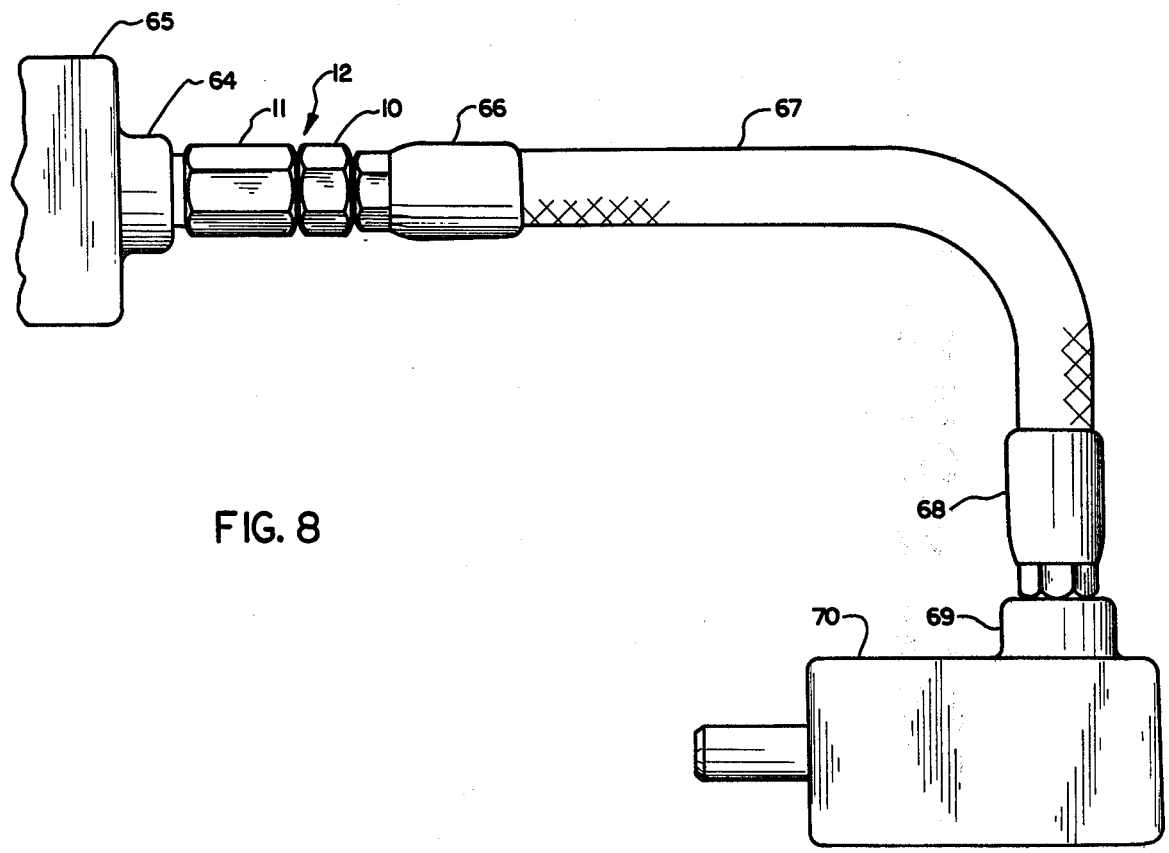
FIG. 8 is a schematic drawing showing the manner of installation of the fuse of this invention between an outlet boss and a flexible hose.

In the installation shown in FIG. 8 a fuse of this invention 12, comprising adapter body 11 and subassembly 10 is fastened by mating screw threads to boss 64 of pressure source 65. A hose fitting 66 of hose 67 is fastened by mating screw threads to subassembly 10. Hose fitting 68 of hose 67 is fastened by mating screw threads to boss 69 of motor or actuator 70. It can be readily visualized that if, as here represented, hose fitting 66 also mates with boss 64 fuse 12 could be post operationally installed without modification.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A valve assembly operable to block fluid flows in excess of a predetermined fluid flow, said valve assembly comprising a housing for conducting fluid, said housing including an inner side surface which includes a converging surface area, an inlet end portion disposed at a first end of said converging surface area and having a first diameter, and an outlet end portion disposed at a second end of said converging surface area and having a second diameter which is smaller than the first diameter, a flow control member disposed in said housing, said flow control member having a circular rim with a sharp edge portion which cooperates with said inner side surface of said housing to form a first variable size orifice, said flow control member being movable relative to said housing between a first position in which said sharp edge portion of the rim of said flow control member cooperates with said inlet end portion of said inner side surface of said housing to form an annular orifice having a relatively large cross sectional area and a second position in which said sharp edge portion of the rim of said flow control member cooperates with said outlet end portion of said inner side surface of said housing to form an annular orifice having a relatively small cross sectional area, said sharp edge portion of said flow control member being disposed radially inwardly of said converging surface area during at least a major portion of the movement of said flow control member between the first and second positions, and coil spring means disposed downstream of the rim of said flow control member for urging said flow control member toward said first position and for blocking fluid flow through said housing when said flow control member is in said second position, said coil spring means including a plurality of turns which cooperate to define a second variable size orifice through which fluid flows when said flow control member is in the first position, said turns to said coil spring means being disposed in tight abutting engagement to block fluid flow through said housing when said flow control member is in said second position.

2. A valve assembly as set forth in claim 1 wherein said turns of said coil spring means have a rectangular cross sectional configuration in a radial plane to provide side surfaces which are disposed in flat abutting engagement when said flow control member is in said second position.

3. A valve assembly operable to block fluid flows in excess of a predetermined fluid flow, said valve assembly comprising a housing for conducting fluid, said housing including an inner side surface which includes a first converging surface area, an inlet end portion disposed at an upstream end of said first converging surface area and having a first diameter and an outlet end portion disposed at a downstream end of said first converging surface area and having a second diameter which is less than the first diameter, said housing further including a valve seat disposed downstream of said first converging surface area, said valve seat including a second converging surface area, said second converging surface area having a relatively large diameter at an upstream end of said second converging surface area and a relatively small diameter at a downstream end of said second converging surface area, a flow control member disposed in said housing and movable between an open position and a closed position in which said flow control member engages at least a portion of said valve seat to block fluid flow through said housing, said flow control member including a circular rim with a a first side surface which faces upstream and a second side surface which faces downstream, said first and second side surfaces of said rim intersecting to form a relatively sharp edge portion which is disposed radially inwardly of said first converging surface area during at least a major portion of the movement of said flow control member from the open position to the closed position to form a first orifice between said first converging surface area and rim, said second side surface of said rim extending at an acute angle to said first converging surface area so that said second side surface of said rim diverges from said first converging surface area to provide a fluid receiving space which expands immediately downstream of said sharp edge portion whereby a pressure drop across said first orifice is substantially independent of fluid viscosity, said first orifice continuously decreasing in size during at least a major portion of the movement of said flow control member from the open position to the closed position, said sharp edge portion of said rim being disposed adjacent to said inlet end portion of said inner side surface when said flow control member is in the open position, said sharp edge portion of said rim being disposed adjacent to said outlet end portion of said inner side surface when said flow control member is in the closed position, said sharp edge portion of said rim cooperating with said first converging surface area to provide a pressure drop across said rim which is substantially independent of fluid viscosity as the size of said first orifice continuously decreases during at least a major portion of the movement of said flow control member from the open position to the closed position, said flow control member further including a downstream end portion which cooperates with said second converging surface area to form a second orifice, said second orifice continuously decreasing in size during at least a major portion of the movement of said flow control member from the open position to the closed position, and a stem portion extending upstream in a direction away from said first side surface of said rim, said valve assembly further including guide means for engaging said stem portion and guiding movement of said flow control member between the open and closed positions, and spring means for urging said flow control member away from the closed position toward the open position, said spring means including a coil spring disposed in a telescopic relationship with said stem portion, first retainer means for holding a first end portion of said coil spring against axial movement relative to said housing, and second retainer means for holding a second end portion of said coil spring against axial movement relative to said stem portion of said flow control member, said second retainer means being movable toward said first retainer means by said stem portion to compress said coil spring upon movement of said flow control member from the open position toward the closed position.

4. A valve assembly as set forth in claim 3 wherein a tangent to said first converging surface area extends at a first acute angle to a central axis of said flow control member and a tangent to said second converging surface area extends at a second acute angle to the central axis of said flow control member, said first acute angle being smaller than said second acute angle.

5. A valve assembly as set forth in claim 3 further including surface means disposed downstream of second side surface of said circular rim for engaging at least a portion of said valve seat when said flow control member is in the closed position.

6. A valve assembly as set forth in claim 3 further including deformable means for engaging said valve seat when said flow control member is in the closed position, said flow control member being formed of a material which is relatively hard to deform and said deformable means being formed of a material which is more easily deformed under the influence of forces which are present upon engagement of said flow control member with said valve seat.

* * * * *